(12) United States Patent
Suzuki (10) Patent No.: US 6,469,466 B1
(45) Date of Patent: Oct. 22, 2002

(54) AUTOMATIC GUIDED VEHICLE

(75) Inventor: Takayuki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 75 days.

(21) Appl. No.: 09/712,947

(22) Filed: Nov. 16, 2000

(30) Foreign Application Priority Data

Nov. 24, 1999 (JP) .......................................... 11-332745

(51) Int. Cl.[7] .................................................. G05D 1/00
(52) U.S. Cl. ...................................... 318/580; 318/587
(58) Field of Search ........................... 318/568.12, 580, 318/587

(56) References Cited

U.S. PATENT DOCUMENTS 5,163,001 A * 11/1992 Luke, Jr. ..................... 318/587
5,525,884 A * 6/1996 Sugiura et al. ............. 318/580

FOREIGN PATENT DOCUMENTS

| JP | 59-102652 | 6/1984 |
| JP | 7-251768 | 10/1995 |
| JP | 8-1553 | 1/1996 |
| JP | 2000-71183 | 3/2000 |

* cited by examiner

*Primary Examiner*—Marlon T. Fletcher
(74) *Attorney, Agent, or Firm*—Harness, Dickey & Pierce, PLC (57) ABSTRACT

Four wheels are provided to four corners of a frame of an automatic guided vehicle. One of the wheels is mounted to the frame and remaining three wheels are mounted on a swing frame that is movably fixed upwardly and downwardly to the frame with a shaft and bearings in order that all wheels are touched to a floor surface always. In addition, a cylinder unit is provided. Its cylinder tube is connected to the swing frame and its rod connected to a piston in the cylinder tube is connected to the frame through a universal coupling. In addition, valves are provided to communicate with the both sides of the piston in the cylinder tube through ports of the cylinder tube. When a robot arm provided to the automatic guided vehicle is operated, the valves are closed to inhibit the incompressive fluid to enter and exit the cylinder tube to lock the swing frame.

8 Claims, 9 Drawing Sheets

AUTOMATIC GUIDED VEHICLE

BACKGROUND OF THE INVENTION

1. Field of the Invention

This invention relates to an automatic guided vehicle.

2. Description of the Prior Art

Automatic guided vehicles used for bearing parts or traveling to a desired place to use its robot arm, are known.

The automatic guided vehicle travels on a floor in a works by a driving mechanism along a runway provided on a floor in a works.

Figure 10:
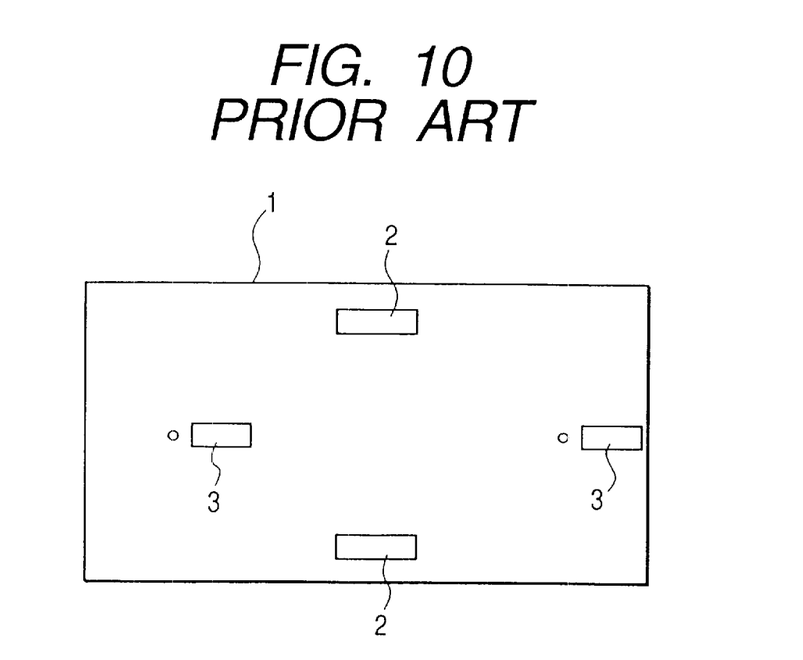
FIG. 10 is a bottom view of a prior art automatic guided vehicle.

FIG. 10 is a bottom view of such a prior art automatic guided vehicle. This automatic guided vehicle has two free casters 3 at the front and rear ends on the centerline of the longitudinal direction of the body 1 and driving wheels 2 at middle portions of both sides of the body 1.

Figure 11:
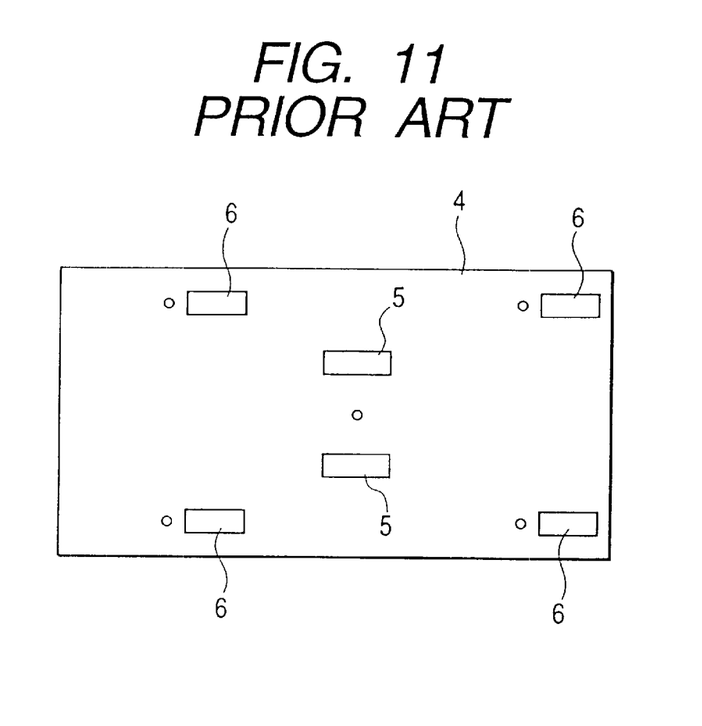
FIG. 11 is a bottom view of another prior art automatic guided vehicle.

FIG. 11 is a bottom view of another prior art automatic guided vehicle. This automatic guided vehicle has four casters 6 at the four corners of the body 4 and driving wheels 5 at middle portions of the body, directed to one of longitudinal directions of the body 4. In these automatic guided vehicles, a portion of wheels (casters) may be untouched when the surface of the runway is rough.

Figure 12:
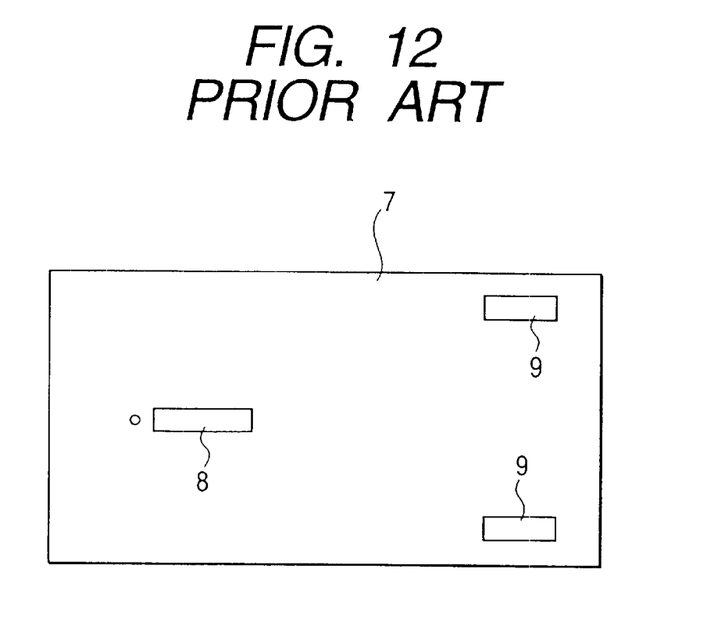
FIG. 12 is a bottom view of a still another prior art automatic guided vehicle.

FIG. 12 is a bottom view of a still another prior art automatic guided vehicle. This automatic guided vehicle has three wheels. A driving wheel 8 is provided at a front end meddle portion and two free casters 9 are provided at rear portion on the both sides. In this type of automatic guided vehicle, when its robot arm is operated such that its center of gravity moves to a corner of the front portion where only one wheel is provided, its body inclines.

To prevent untouchedness of any wheel, an automatic guided vehicle with a suspension mechanism has been provided. Japanese patent provisional publication No. 7-251768 discloses automatic guided vehicles having four wheels and three wheels. In the automatic guided vehicles with four wheels, though running is stable, one or two wheels may be untouched due to roughness of the floor. On the other hand, in the automatic guided vehicles with three wheels, though untouchedness of any wheel is prevented, the position of the automatic guided vehicle becomes unstable when a heavy load is applied to a corner where no wheel is provided. To prevent untouchedness of any wheel, a loading mechanism (spring-loading) is provided to the wheels as a suspension mechanism. The loading mechanism presses a wheel to the floor. However, the position of the body of this automatic guided vehicle may incline when a robot arm is operated, for example.

SUMMARY OF THE INVENTION

The aim of the present invention is to provide a superior automatic guided vehicle.

According to the present invention, a first aspect of the present invention is an automatic guided vehicle comprising: a frame having four corners at a bottom portion of said frame; wheels provided to said corners, respectively; a carriage mechanism, including a supporting member provided to said frame to support at least one of said wheels, for changing a vertical position of said at least one of said wheels relative to said frame; a cylinder unit, including: a cylinder tube; a piston movable in the cylinder tube; and covers on both ends of said cylinder tube having ports communicated with the both sides of said piston, respectively, said piston having a rod extending through one of said covers, one of said cylinder tube and said rod being connected to said supporting member of said at least a wheel, the other of said cylinder tube and said rod being connected to said frame; a valve communicated with said ports for allowing said incompressive fluid to enter and exit said cylinder tube through said ports with movement of said piston in an open condition thereof and for inhibiting said incompressive fluid to enter and exit said cylinder tube through said ports in a close condition thereof to lock said vertical position; and control means for controlling said valve in said close condition when said carriage mechanism is stopped.

Preferably, the automatic guided vehicle further comprises a tank communicated with said ports through said valve for reserving said incompressive fluid. Moreover, said tank is arranged above said cylinder unit.

Preferably, said supporting member includes a swing frame provided to said frame under said frame, one of said wheels being provided to said frame, and the remaining three wheels including said at least a wheel are mounted on said swing frame.

According to the present invention, a second aspect of the present invention is an automatic guided vehicle comprising: a frame having four corners at bottom portion of said frame; wheels provided to said corners, respectively; carriage mechanism, including a supporting member provided to said frame to support at least one of said wheels, for changing a vertical position of said at least one of said wheels relative to said frame; driving and steering means for driving and steering at least one of said wheels; driving control means for controlling said driving and steering means; and locking and releasing means for locking and releasing said vertical position in accordance with a request.

Preferably, the automatic guided vehicle further comprises a guide line sensor for detecting a line on a floor, wherein said driving control means control said driving and steering means in accordance with said guide line sensor.

Preferably, said locking and releasing means comprises: a cylinder unit including: a cylinder tube; a piston movable in the cylinder tube; and covers on both ends of said cylinder tube having ports communicated with the both sides of said piston, respectively; said piston having a rod extending through one of said covers, one of said cylinder tube and said rod being connected to said supporting member of said at least a wheel, the other of said cylinder tube and said rod being connected to said frame; a valve communicated with said ports for allowing said incompressive fluid to enter and exit said cylinder tube through said ports with movement of said piston in an open condition thereof and for inhibiting said incompressive fluid to enter and exit said cylinder tube through said ports in a close condition thereof to lock said vertical position.

Preferably, the automatic guided vehicle further comprises a tank, arranged above said cylinder unit, communicated with said ports through said valve for reserving said incompressive fluid.

Preferably, said supporting member includes a swing frame provided under said frame to change said vertical position, one of said wheels is provided to said frame, and the remaining three wheels including said at least a wheel are mounted on said swing frame.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

An automatic guided vehicle according to an embodiment of the present invention will be described with reference to FIGS. 1 to 8.

Figure 8:
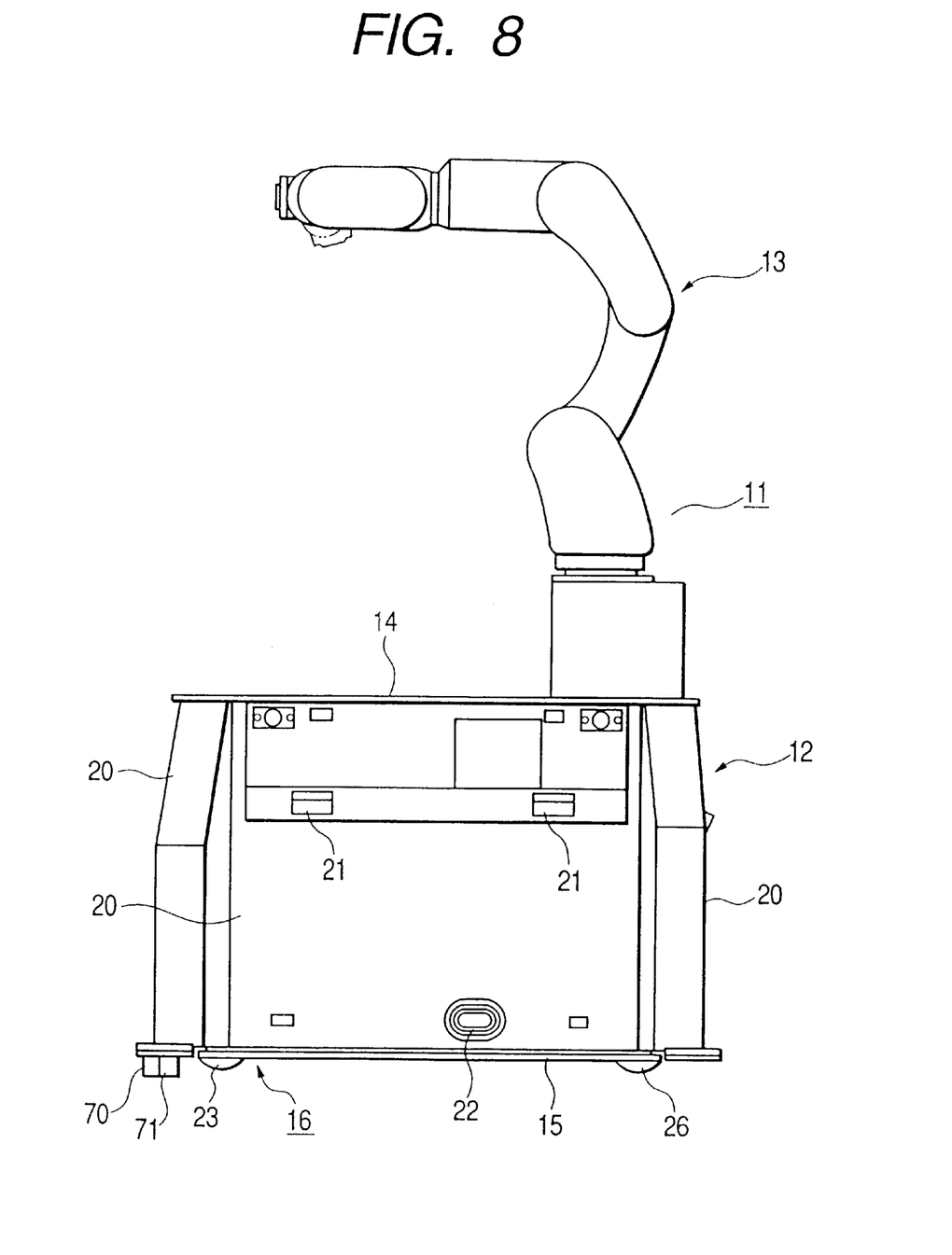
FIG. 8 is a side view of the automatic guided vehicle according to the embodiment of the present invention.

FIG. 8 shows a side view outline of a traveling robot 11 including the automatic guided vehicle 12 according to the embodiment.

The automatic guided vehicle 12 has a rectangular parallelepiped shape. A robot arm 13 is mounted on a top plate 14 of the body 12. The robot arm 13 has a multi-axis structure (six axes) and is mounted at the rear end (at the right on the drawing) of the top plate 14. The robot arm 13 performs various operations such as delivering a work, assembling parts, processing, and inspection with attachable tools (not shown) such as a hand.

Figure 1:
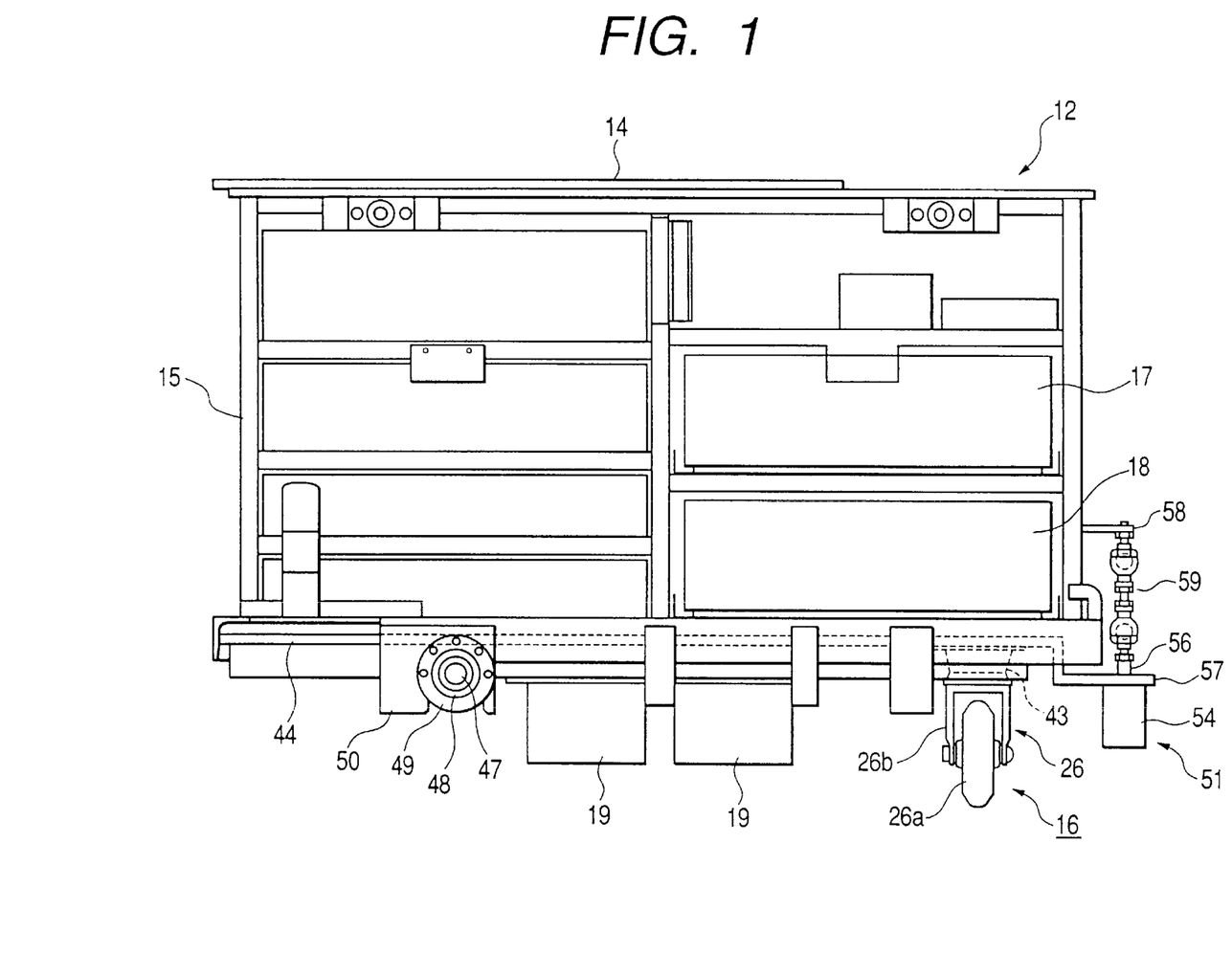
FIG. 1 is a side view of an automatic guided vehicle according to an embodiment of the present invention.
Figure 5:
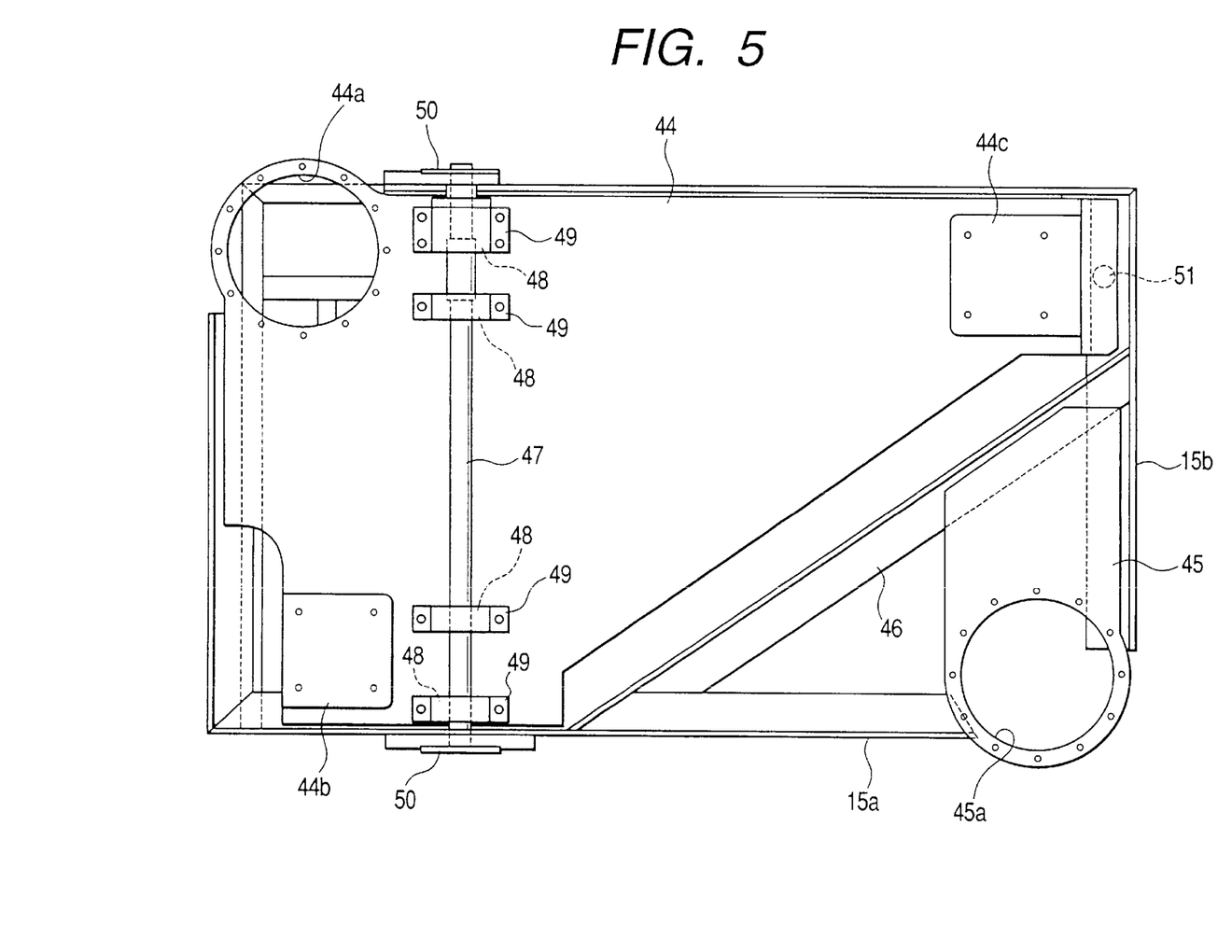
FIG. 5 is a bottom view of the automatic guided vehicle according to the embodiment of the present invention.
Figure 6:
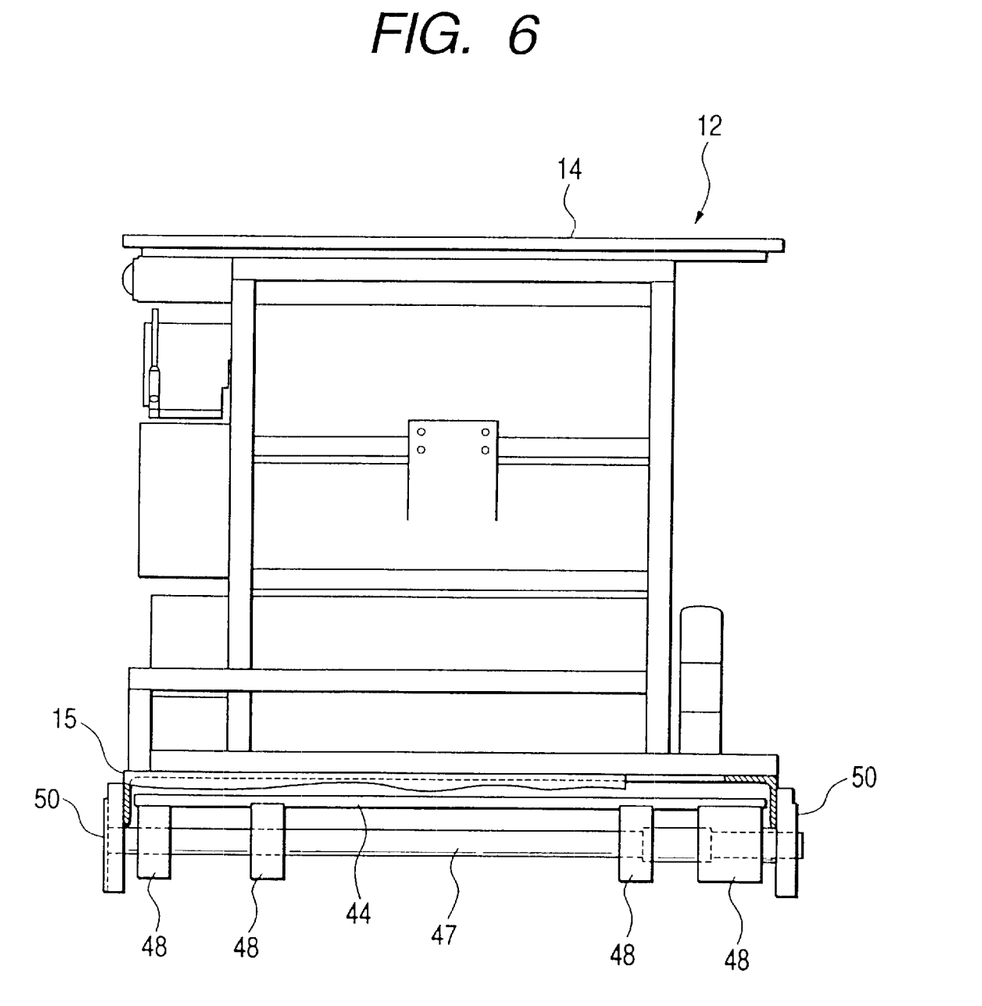
FIG. 6 is a front view of the automatic guided vehicle according to the embodiment of the present invention.

FIG. 5 shows a bottom view of the automatic guided vehicle 12 and FIG. 6 shows a front view of the automatic guided vehicle 12 without a cover 20. As shown in FIGS. 5 and 6, the automatic guided vehicle 12 has a frame 15 having a rack structure (outline is parallelepiped shape) and traveling mechanisms 16 attached to the frame. Moreover, as shown in FIG. 1, the automatic guided vehicle 12 has various units such as a robot arm control unit 17 for controlling and driving the robot arm 13, a traveling control unit 18 for controlling and driving the traveling mechanism 16. In addition, other elements such as motors for traveling (mentioned later), a battery (not shown), a charging unit 19, etc., are assembled in the 10 frame 1.

The top plate 14 on the top of the frame 15 supports supporting blocks for supporting a work or supports jigs. Moreover, covers 20 are provided on the sides and front and rear ends of the frame 15 (partially shown in FIG. 8). Though the drawing of FIG. 8 does not completely show, the covers 20 have various items such as obstacle sensors 21 (partially shown in FIG. 8) and a connector 22 for charging unit 19. Moreover, a guide line sensor 70 and a stop mark sensor 71 are provided at the front bottom portion of the frame 15. The guide line sensor 70 detects the line marked on the floor for indicating traveling direction. The output of the guide line sensor 70 is supplied to the drive control unit 18 to control traveling of the automatic guided vehicle 12. The output of the stop mark sensor 71 is also supplied to the drive control unit 18 to indicate the stop position of the automatic guided vehicle 12. The guide line sensor 70 and the stop mark sensor 71 are not shown in FIG. 1.

Figure 7:
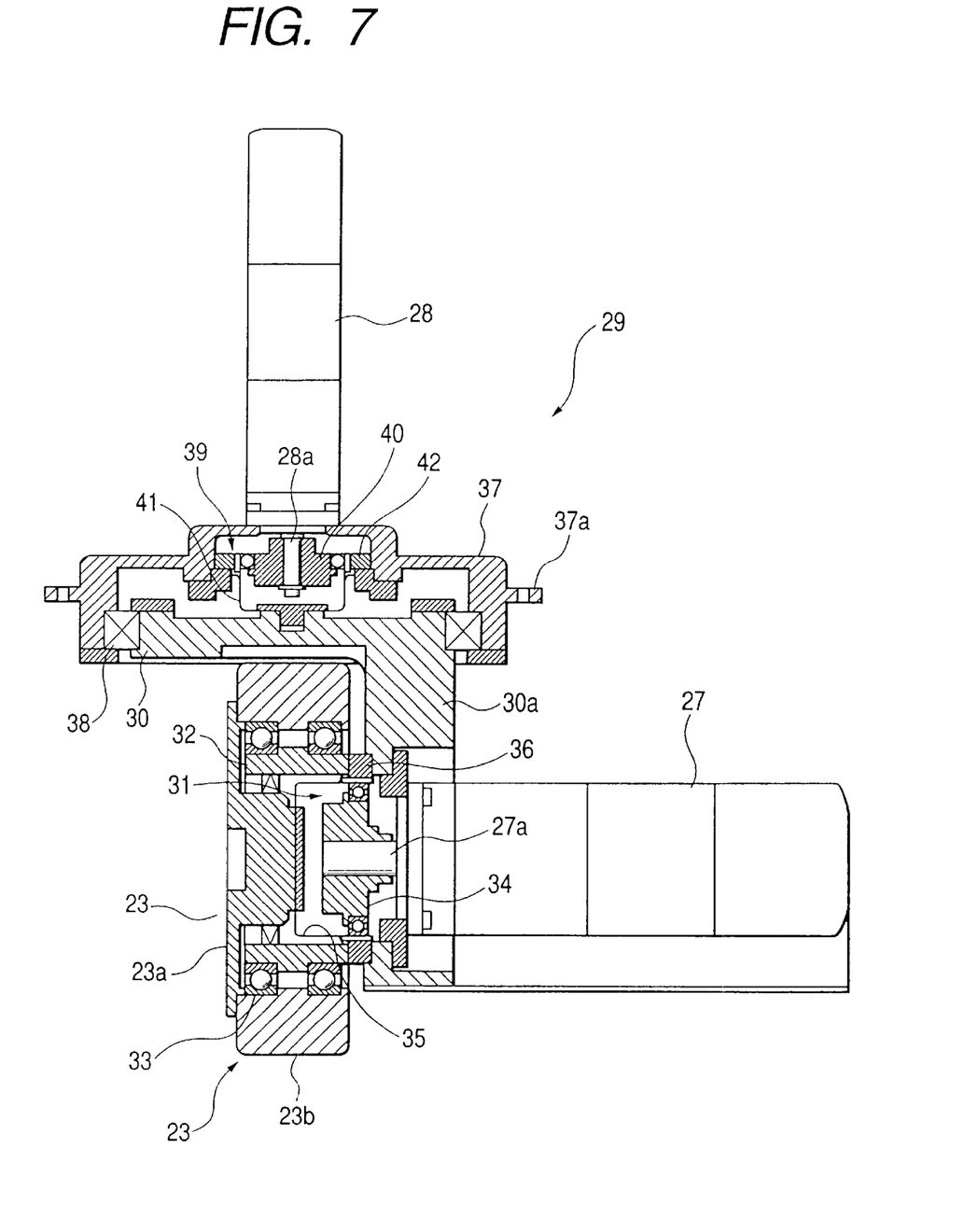
FIG. 7 is a partially-cross-sectional side view of a driving unit of the automatic guided vehicle according to the present invention.

The traveling mechanism 16 will be described with reference to FIGS. 4 to 7. FIG. 7 shows a partially-cross-sectional side view of a driving unit 29.

The traveling mechanisms 16 are provided at a bottom portion of the frame 15, having wheels 23 to 26, respectively. These wheels are arranged at corners of the bottom portion of the automatic guided vehicle 12. A pair of wheels at corners on one diagonal line (the left front corner and the right rear end corner) are driving wheels 23 and 24. The other pair of wheels are casters 25 and 26. As representively shown in FIG. 7, the driving unit 29 includes a driving motor 27, a steering motor 28, and the driving wheel 23. In addition, the driving unit 29 includes a rotation frame 30 having a substantially circular plate and a motor mounting portion 30a. The driving motor 27 is mounted on the motor mounting portion 30a with a right angle relation with the steering motor 28. The spindle 27a of the driving motor 27 is coupled to the driving wheel 23 through a reduction mechanism 31.

The driving wheel 23 has a rim 23a having a sleeve shape and a tire 23b mounted on a peripheral of the rim 23a and is rotatably supported around a horizontal axis by a bearing sleeve 32 fixed to the motor mount 30a extending to the left on the drawing through a bearing 33. The reduction mechanism 31 comprises a harmonic drive (trade name). More specifically, the reduction mechanism 31 includes a wave generator 34, a flexspline 35 fixed to a rim 23a of the driving motor 27, and a circular spline 36 sandwiched between the motor mount 30a and bearing sleeve 32.

On the other hand, the rotation frame 30 is rotatably supported by an inner surface of the mounting frame 37 having a bowl shape of which inner surface is downwardly directed through a bearing 38 around to its vertical axis and is coupled to the steering motor 28 through a reduction mechanism 39. The reduction mechanism 39 also comprises a harmonic drive (trade name). More specifically, the reduction mechanism 39 includes a wave generator 40 fixed to a spindle 28a of the steering motor 28, a flex spline 41 fixed to the upper surface of the rotation frame 30, and a circular spline 42 fixed to the mounting frame 37.

The driving unit 29 is structured as mentioned above. The driving motor 27 rotates the driving wheel 23 and the steering motor 28 rotates (pivots) the rotation frame 30 around its vertical axis to orientate the driving wheel 23 together with the driving motor 27, etc. to provide steering. A traveling control unit 18 controls these driving motor 27 and the steering motor 28.

Moreover, the mounting frame 37 has a mounting flange 37a at peripheral of the mounting frame 37 and fixed to the bottom of the automatic guided vehicle 12 with bolts.

On the other hand, as the caster 26 is represetively shown in FIG. 1, the caster 26 (25) has a wheel 26a and a supporting plate 26b for rotatably supporting the wheel 26a around its horizontal axis. In addition, a mounting plate 43 is rotatably supports the supporting plate 26b around its vertical axis. The mounting plate 43 is fixed to the bottom of the automatic guided vehicle 12. Thus, the caster 25 and 26 rotate with their respective rotation speeds and directions corresponding to the temporal traveling direction of the automatic guided vehicle 12.

One of the wheels 23 to 26, that is, the driving wheel 24 (driving unit 29) in this embodiment, is directly mounted on the bottom of the frame 15 and the remaining three wheels, that is driving wheel 23 (driving unit 29) and casters 25 and 26 are mounted on a swing frame 44 provided under the frame 15 for supporting the wheels with swing.

That is, as shown in FIG. 5, the frame 15 has a rectangular shape of which longitudinal direction corresponds to the front direction of the automatic guided vehicle 12. At the right rear corner (at right-hand bottom of the drawing), a driving unit mounting plate 45 is fixed to the frame 15. The driving unit mounting plate 45 has a circular mounting hole 45a and is fixed to a first portion 15a of the frame 15 and a reinforcing plate 46 which is diagonally provided between the first portion 15a of the frame 15 and a second portion 15b of the frame 15 which is the neighbor side of the first portion 15a. The driving unit 29 (driving wheel 24) is fit into the mounting hole 45a from the lower side of the mounting hole 45a. The mounting flange 37a of the mounting frame 37 is fixed to the driving unit mounting plate 45 with bolts to fix the driving unit 29 to the frame 15.

The swing frame 44 as a carriage mechanism has a trapezoid shape plate such that a triangle is removed from a rectangular. As shown in FIG. 5, the swing frame 44 has a circular mounting hole 44a as similar to the mounting hole 45a at the left of the front (left-hand top of the drawing) and caster mounting portions 44b and 44c for mounting the caster 25 and 26, respectively. The driving unit 29 for the driving wheel 23 is fixed to the mounting hole 44a with bolts and the mounting plates 43 of the casters 25 and 26 are fixed to the caster mounting portion 44b and 44c with bolts.

Moreover, a shaft 47 is rotatably fixed to the lower surface of the swing frame 44 just after (just right side of) the mounting holes 44a and the caster mounting portion 44, extending in the right and left directions of the automatic guided vehicle 12. More specifically, two bearing housings 49 including bearings 48, respectively, are fixed to the lower surface of the swing frame 44 at the both sides of the swing frame 44, respectively. That is, four bearing housings 49 are fixed on the lower surface of the swing frame 44 with the shaft 47 piercing the bearings 48.

On the other hand, the frame 15 has a pair of shaft mounting plates 50 extending downwardly from the right and left side edges at the front of the frame 15. The both ends of the shaft 47 are fixed to the shaft mounting plate 50 fixed to the frame 15. Thus, the swing frame 44 swings up and down around the shaft 47 horizontally extending in the right and left directions of the automatic guided vehicle 12 (the axis of the shaft is shown with A in FIG. 4).

In addition, on the bottom of the automatic guided vehicle 12 (at the frame 15), the guide line sensor 70 for detecting a guide line on a floor and the stop mark sensor 71 for detecting a stop mark on the floor indicating a stop position are provided.

Figure 2:
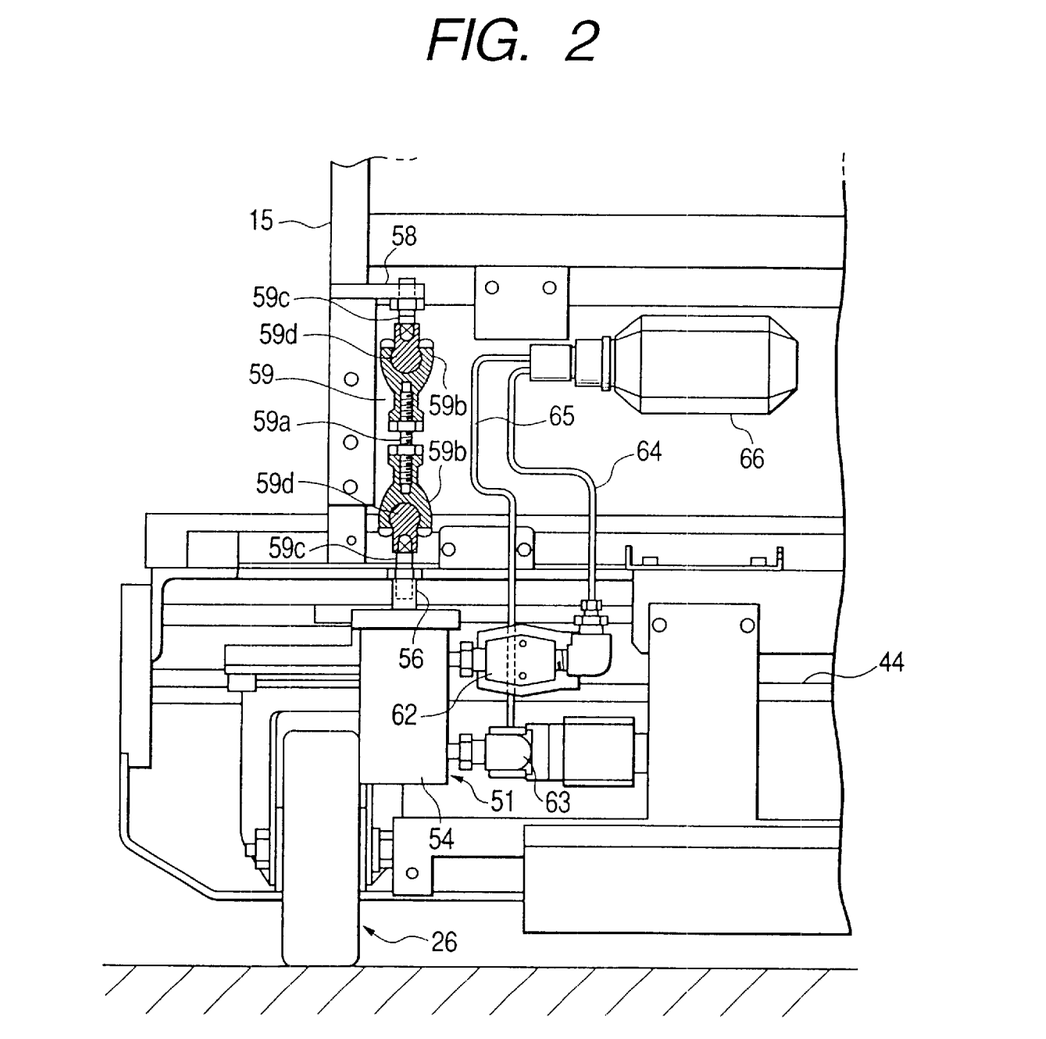
FIG. 2 is a front view of a main portion of the automatic guided vehicle.

Between the swing frame 44 and the frame 15, a cylinder unit 51, shown in FIGS. 1 and 2, is provided. The cylinder unit 51 includes a cylinder tube 54, a rod cover 52 and a head cover 53 provided at the both ends of the cylinder 51, respectively, a piston 55 reciprocal in the cylinder 55. Moreover, the cylinder unit 51 has a rod 56 connected to the piston 55 through an oil sealed through hole of the rod cover 52, extending upwardly. The swing frame 44 has a mounting seat 57 on which the head cover 53 is fixed with bolts.

At the middle level of the frame 15 a connecting portion 58 is fixed and the rod 56 is coupled to the connecting portion 58 through a universal coupling 59.

The universal coupling 59 includes a short rigid shaft 59a having spherical joint metals 59b at the both ends of the rigid shaft 44a, mounting rods 59d having ball heads 59c which are fitted into the spherical joint metal 59b. Ends of the mounting shaft 59c are fixed to the rod 56 and the connecting portion 58. This universal coupling 59 allows the rigid shaft 59a to incline to the mounting rods 59c.

Figure 3:
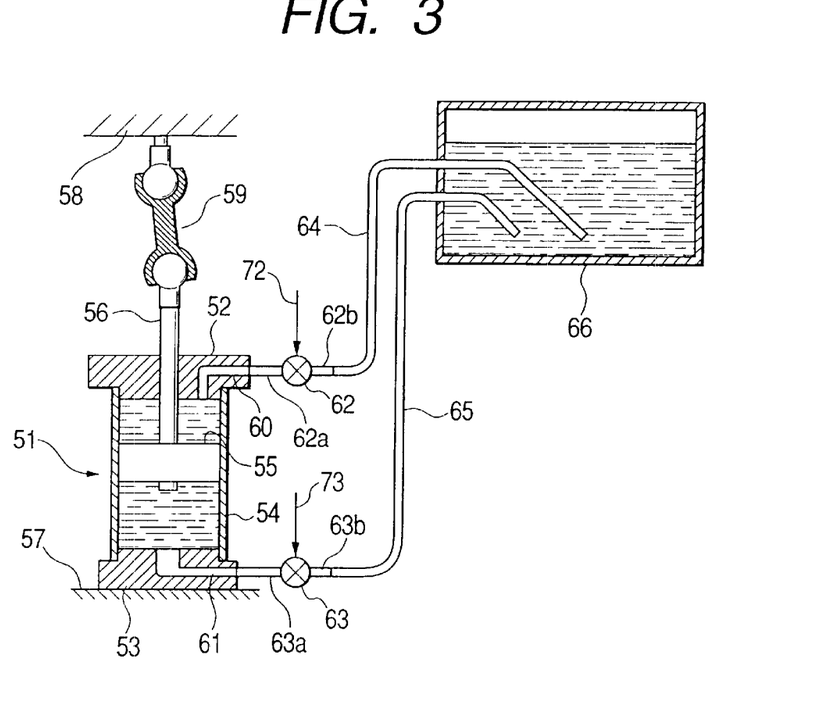
FIG. 3 is an outline drawing illustrating the cylinder unit according to this embodiment.
Figure 4:
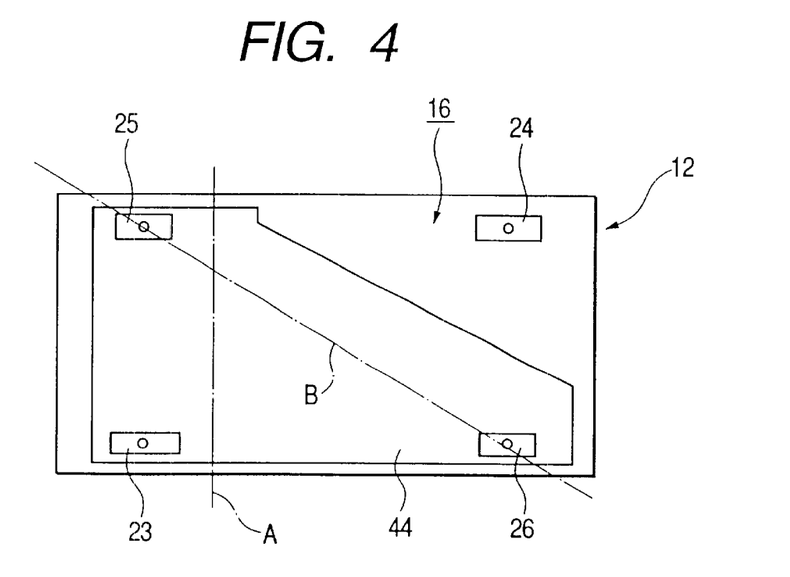
FIG. 4 is an outline view illustrating arrangement of wheels of the automatic guided vehicle according to the embodiment.

As shown in FIG. 3, in the rod cover 52 and head cover 53 (on the both sides of the piston 55), input and output holes (ports) 60 and 61 are provided, respectively. These output input holes 60 and 61 are directly connected to one sides of coupling holes 62a and 63a of electromagnetic valves 62 and 63 through pipes, respectively. The other sides of coupling holes 62b and 63b of the electromagnetic valves 62 and 63 are connected to one ends of flexible plastic pipes 64 and 65. The other end portions of plastic pipe 64 and 65 are connected to a tank 66 arranged above the cylinder tube 54. The electromagnetic valves 62 and 63 are controlled by the traveling control unit 18.

A closed loop including the cylinder tube 54, the electromagnetic valves 62 and 63, the plastic pipes 64 and 65, and the tank 66 is filled with oil as incompressive fluid except the space (the air) at the upper portion of the tank 66. Moreover, the ends of the other end portions of plastic pipes 64 and 65 are inserted into the tank 66 and submerged in the oil. The arrangement, of the tank 66 above the cylinder tube 54 makes bleeding the closed loop of the air easy and prevents the air from entering the closed loop.

The traveling robot 11 having the structure mentioned above travels along a runway provided on a floor of a works by the traveling unit 16 of the automatic guided vehicle 12.

During traveling, the robot arm 13 is set right over the frame 15 to make the center if gravity of the whole of the traveling robot 11 on the driving wheel (23)'s side of the diagonal line B. The electromagnetic valves 62 and 63 are opened in response to drive signals 72 and 73 to allow the oil in the cylinder tube 54 to enter therein and exit therefrom. This makes (release) the swing frame 44 free in up and down swing operation to the frame 15.

That is, when the interval between the swing frame 44 of the cylinder unit (51)'s side and the frame 15 decreases, the piston moves downwardly. The oil under the piston 55 in the cylinder tube 54 is pressed, so that a portion of the oil under the piston 55 flows through the output and input hole 61 and enters the tank 66 via the electromagnetic valve 63 and the plastic pipe 65. On the other hand, the pressure of the oil above the piston 55 is reduced, so that a portion of the oil in the tank 66 flows toward the cylinder tube 54 through the plastic pipe 64, the electromagnetic valve 62, and the output and input hole 60.

When the interval between the swing frame 44 of the cylinder unit (51)'s side and the frame 15 increases, the piston moves upwardly. The oil above the piston 55 in the cylinder tube 54 is pressed, so that a portion of the oil above the piston 55 flows through the output and input hole 60 and enters the tank 66 via the electromagnetic valve 62 and the plastic pipe 64. On the other hand, the pressure of the oil under the piston 55 is reduced, so that a portion of the oil in the tank 66 flows toward the cylinder tube 54 through the plastic pipe 65, the electromagnetic valve 63, and the output and input hole 61. Accordingly, free flowing of the oil in the closed loop allows the swing frame 44 to freely swing.

During swinging of the swing frame 44, the cylinder tube 54 moves up and down with a circular loci of which center corresponds to the axis of the shaft 47. However, the rod 56 only linearly moves along the axis of the cylinder tube 54. Therefore, when the cylinder tube 54 moves up and down with the circular loci, the incline angle of the rod 56 varies. In this embodiment, the universal coupling 59 is used, so that the inclination of the rod 56 is absorbed by the universal coupling 59. Accordingly, lateral stress is prevented.

As mentioned above, because the driving wheels 23 and 24 are arranged on one diagonal line of the rectangular bottom portion of the automatic guided vehicle 12 and the casters 25 and 26 are arranged on the other diagonal line, when the traveling robot 11 travels, forward and backward movements are provided by driving wheels 23 and 24 of which the number is least with good balance.

Moreover, rotation of the automatic guided vehicle 12 with a small radius (spin turn) is provided. Moreover, the steering motors 28 can freely and independently change the directions of the driving wheel, so that steering. operation is readily effected. Thus, it is easy to control the rotation speeds of the driving motors 27 because it is sufficient to control these driving wheels 23 and 24 at the same rotation speed.

On the other hand, there is slight roughness on the floor.

At such location, the driving wheel 23 and the casters 24 and 25 are mounted on one swing frame 44, so that these three wheels can always touch to the floor. The remaining driving wheel 24 moves up and down relatively to the swing frame 44, so that the driving wheel 24 can touch the floor at the same time though there is roughness on the floor. Thus, this structure provides touching of all wheels all time.

When the robot arm is operated or a load is put on the upper place 14 while the automatic guided vehicle 12 stops, there is possibility that an excessive load is applied to a corner. In this case, if the electromagnet valves 62 and 63 are not closed, the frame 15 may incline. More specifically, if the center of gravity of the load moves beyond the diagonal line B to the driving wheel (24)'s side, the swing frame 44, the frame 15 inclines relatively to the swing frame. Then, the electromagnetic valves 62 and 63 are closed during the operation including the robot arm operation and a heavy load carrying operation to lock the swing frame with respect to the frame 15.

According to the embodiment of the present invention, all wheels can be surly touched to the floor, so that stable traveling is provided with the electromagnetic valves closed. Moreover, when the electromagnetic valves 62 and 63 are closed, the frame 15 does not incline though the robot arm 13 is operated and a heavy load is loaded at the side of the driving wheel 24 beyond the diagonal line B.

This invention is not limited to the above-mentioned embodiment and there are various modifications.

For example, the cylinder tube 54 is connected to the frame 15 and the rod 56 is connected to the swing frame 44.

Figure 9:
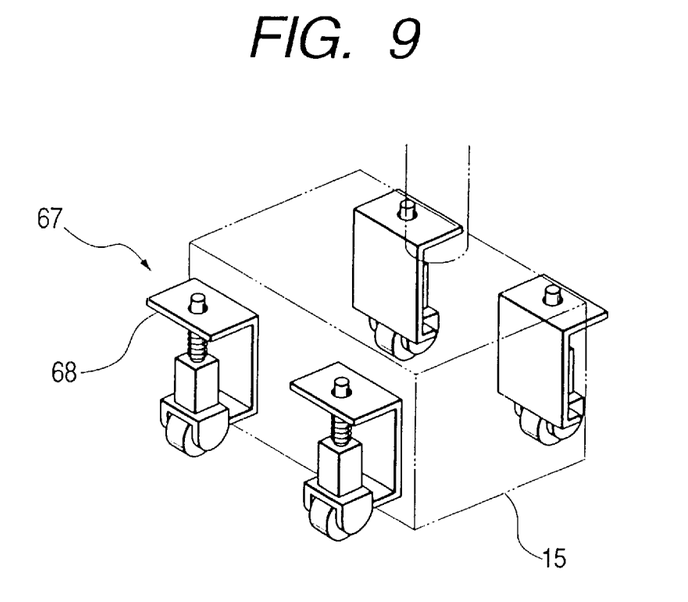
FIG. 9 shows a suspension mechanism as a modification of the present invention.

Moreover, FIG. 9 shows a suspension mechanism as a modification. In this modification, all four wheels are movably mounted to the frame 15 upwardly and downwardly with suspension units 67 by a supporting member 68. Moreover, the cylinder units 51 are provided between the frame 15 and the supporting members 68.

Moreover, two wheels out of four wheels are mounted on the swing fame which upwardly and downwardly swings relative to the frame 15. Then, the movement of the swing frame is controlled, that is, released and locked by the cylinder unit 51.

The automatic guided vehicle 12 may not mount the robot arm 13 to be used only for bearing works.

The cylinder unit 51 is used for locking and releasing the swing frame. However, there are various locking and releasing mechanisms. For example, a mechanical clutch system may replace the hydraulic system mentioned above.

What is claimed is:

1. An automatic guided vehicle comprising:
   a frame having four corners at a bottom portion of said frame;
   wheels provided to said corners, respectively;
   a carriage mechanism, including a supporting member provided to said frame to support at least one of said wheels, for changing a vertical position of said at least one of said wheels relative to said frame;
   a cylinder unit, including: a cylinder tube; a piston movable in the cylinder tube; and covers on both ends of said cylinder tube having ports communicated with the both sides of said piston, respectively, said piston having a rod extending through one of said covers, one of said cylinder tube and said rod being connected to said supporting member of said at least a wheel, the other of said cylinder tube and said rod being connected to said frame;
   a valve communicated with said ports for allowing said incompressive fluid to enter and exit said cylinder tube through said ports with movement of said piston in an open condition thereof and for inhibiting said incompressive fluid to enter and exit said cylinder tube through said ports in a close condition thereof to lock said vertical position; and
   control means for controlling said valve in said close condition when said carriage mechanism is stopped.

2. An automatic guided vehicle as claimed in claim 1, further comprising a tank communicated with said ports through said valve for reserving said incompressive fluid.

3. An automatic guided vehicle as claimed in claim 2, wherein said tank is arranged above said cylinder unit.

4. An automatic guided vehicle as claimed in claim 1, wherein said supporting member includes a swing frame provided to said frame under said frame, one of said wheels being provided to said frame, and the remaining three wheels including said at least a wheel are mounted on said swing frame.

5. An automatic guided vehicle comprising:
   a frame having four corners at bottom portion of said frame;
   wheels provided to said corners, respectively;
   carriage mechanism, including a supporting member provided to said frame to support at least one of said wheels, for changing a vertical position of said at least one of said wheels relative to said frame;
   driving and steering means for driving and steering at lest one of said wheels;
   driving control means for controlling said driving and steering means; and
   locking and releasing means for locking and releasing said vertical position in accordance with a request, said locking and releasing means comprising:
   a cylinder unit including: a cylinder tube; a piston movable in the cylinder tube; and covers on both ends of said cylinder tube having ports communicated with the both sides of said piston, respectively;
   said piston having a rod extending through one of said covers, one of said cylinder tube and said rod being connected to said supporting member of said at least a wheel, the other of said cylinder tube and said rod being connected to said frame;

a valve communicated with said ports for allowing said incompressive fluid to enter and exit said cylinder tube through said ports with movement of said piston in an open condition thereof and for inhibiting said incompressive fluid to enter and exit said cylinder tube through said ports in a close condition thereof to lock said vertical position.

6. An automatic guided vehicle as claimed in claim 5, further comprising a guide line sensor for detecting a line on a floor, wherein said driving control means control said driving and steering means in accordance with said guide line sensor.

7. An automatic guided vehicle as claimed in claim 5, further comprising a tank, arranged above said cylinder unit, communicated with said ports through said valve for reserving said incompressive fluid.

8. An automatic guided vehicle as claimed in claim 5, wherein said supporting member includes a swing frame provided under said frame to change said vertical position, one of said wheels is provided to said frame, and the remaining three wheels including said at least a wheel are mounted on said swing frame.

* * * * *